United States Patent [19]

Currin

[11] 4,107,000
[45] Aug. 15, 1978

[54] SOLAR STILL
[75] Inventor: Cedric G. Currin, Midland, Mich.
[73] Assignee: Dow Corning Corporation, Midland, Mich.
[21] Appl. No.: 617,555
[22] Filed: Sep. 29, 1975
[51] Int. Cl.² ........................ B01D 1/00; B01D 3/00
[52] U.S. Cl. ............................. 202/188; 202/234; 203/10; 203/100; 203/DIG. 1
[58] Field of Search ............... 202/234, 197, 188; 203/DIG. 1, 10, 100; 126/271

[56] References Cited
U.S. PATENT DOCUMENTS

| | | | |
|---|---|---|---|
| 2,848,389 | 8/1958 | Bjorksten | 202/234 |
| 2,975,107 | 3/1961 | Friedman | 203/DIG. 1 |
| 3,190,816 | 6/1965 | Ademec | 202/234 |
| 3,192,133 | 6/1965 | Ademec | 202/234 |
| 3,215,134 | 11/1965 | Thomason | 126/271 |
| 3,270,739 | 9/1966 | Thomason | 126/271 |
| 3,279,533 | 10/1966 | Kersteter | 202/197 |
| 3,415,719 | 10/1968 | Telkes | 202/234 |
| 3,514,942 | 6/1970 | Kynyluk | 159/1 |

Primary Examiner—Wilbur L. Bascomb, Jr.
Attorney, Agent, or Firm—Howard W. Hermann

[57] ABSTRACT

There is described a solar still comprising a pair of juxtaposed corrugated sheets which in a preferred embodiment are positioned at an angle to one another whereby the upper sheet rests on the raised portions of the lower sheet. A thermally insulating, solar energy transmitting window overlies the upper sheet. The upper sheet is made of solar energy absorbent material and the lower portions of the sheet are adapted to contain water to be distilled. A plurality of vents are provided in the uppermost portions of the upper sheet and the lower sheet and are adapted to be placed on the ground or a body of water for cooling and act as a condenser for vapor passing through the vents into the space below the upper sheet.

6 Claims, 2 Drawing Figures

SOLAR STILL

BACKGROUND OF THE INVENTION

The present invention relates to solar energy powered distillation units for providing supplies of fresh water.

Various types of solar stills have been designed and are being used in various parts of the world. All, however, suffer from disadvantages of one type or another. In most units the basic objections are related to efficiency and/or cost. For example, in many prior art units the condensing system is positioned over the evaporating system resulting in interference with energy reaching the evaporating system and relative inefficiency of condensation. The present invention is aimed at providing an increased efficiency to solar stills at low cost and with need for a minimum of labor.

SUMMARY OF THE PRESENT INVENTION

In accordance with the objectives of the present invention there is provided a pair of corrugated sheets in juxtaposition with the corrugations preferably running at an angle to one another whereby the upper sheet rests on the uppermost portions of the lower sheet. The first corrugated sheet is made of solar energy absorbent material and has a plurality of vent holes in the upper portions thereof communicating between the upper and lower surfaces of the sheet. A thermally insulating solar energy transmitting window rests on the uppermost areas of the first sheet thereby forming a plurality of parallel channels in the lower portions of the corrugations which channels are filled with the water to be distilled. The second sheet is cooled, preferably by contact with the ground or body of water which acts as a heat sink and causes condensation of water evaporated from the channels in the upper sheet and passing through the vent holes to the space below. The condensed water is then simply drained from the system.

The configuration of the present invention provides an extremely simple device to fabricate. Yet, there is a minimum of interference with solar energy being transmitted to the light absorbent sheet and the water therein for evaporation thereof. The natural heat sink effect of the earth can be utilized for chilling the condenser sheet underneath the energy absorbent sheet. Installation is simple; the only requirement being that the system is installed in a substantially level position.

BRIEF DESCRIPTION OF THE DRAWINGS

Other objects and attendant advantages of the present invention will become apparent to those skilled in the art from a reading of the following detailed description when read in connection with the accompanying drawings wherein.

DESCRIPTION OF PREFERRED EMBODIMENTS

Figure 1:
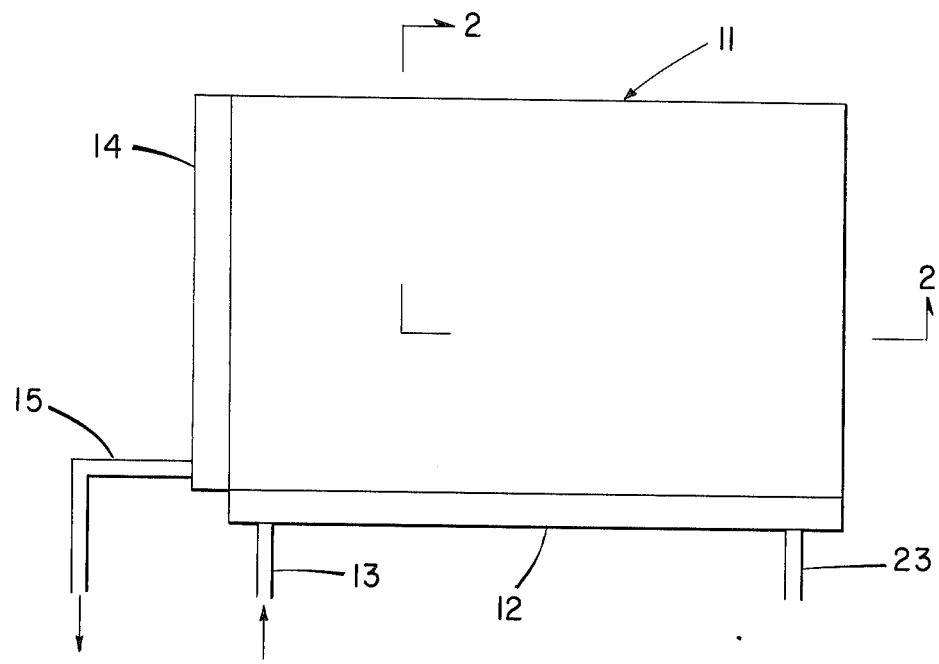
FIG. 1 is a somewhat schematic top plan view of a solar still embodying the present invention.

Referring now to the drawings wherein like reference characters designate like parts throughout the figures thereof there is shown in FIG. 1 a solar still 11 which is generally rectangular in shape and has attached thereto a water supply header 12 fed by a supply pipe 13 along one edge thereof and a distilled water collection header 14 drained by a drainage pipe 15 along another edge thereof. The reasons for this arrangement will become more clear from the cross-sectional view shown in FIG. 2.

Figure 2:
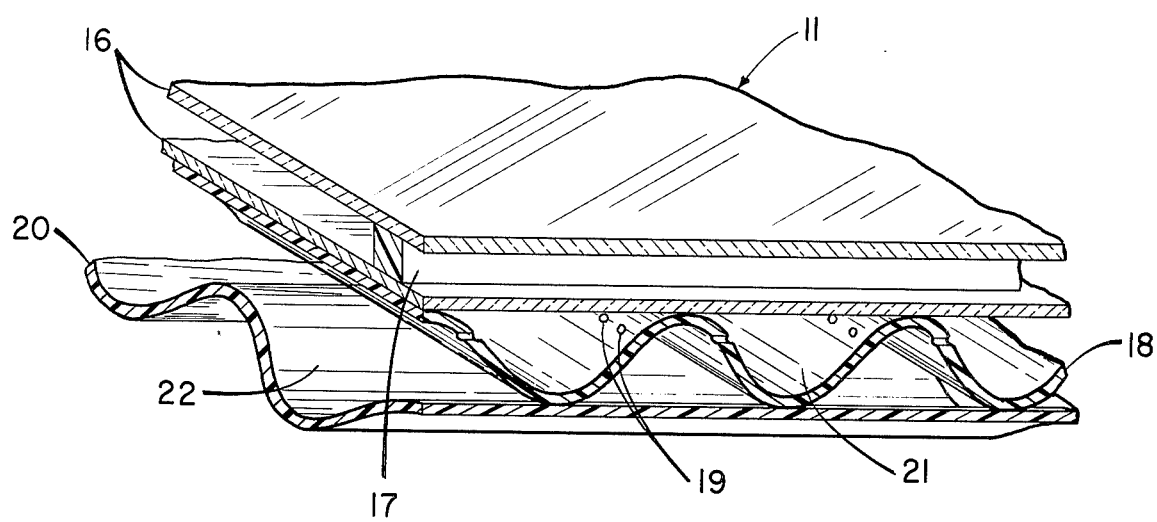
FIG. 2 is a cross-sectional view taken along the lines 2—2 of FIG. 1 to illustrate the construction of the solar still shown therein.

As may be seen from FIG. 2 the still 11 comprises at its top surface a solar energy transmitting, thermally insulating, window 16 which may, for example, comprise a pair of solar energy transmitting panels separated by a series of spacers 17 whereby the air space left between the panels by the spacers acts as the thermal insulation. The bottom panel is desirably made slightly absorbent to solar rays to keep it sufficiently warm to prevent condensation on its surface. These panels can be of glass or of plastics capable of withstanding the weather and temperatures involved. The window 16 rests on the uppermost portions of a first corrugated sheet 18 which is made of solar energy absorbing material such as, for example, aluminum coated with a flat black paint and desirably includes a layer of thermal insulation on its lower side to prevent passage of heat into the condenser area. The corrugated sheet 18 has provided therethrough in the upper portions thereof a plurality of vent holes 19 through which water vapor can pass from one side of the sheet to the other.

The first corrugated sheet 18 rests over a second corrugated sheet 20 which is designed to act as condenser means. In the simplest form of the invention the first and second corrugated sheets are disposed at right angles to one another which thereby enables the water supply header 12 to be mounted with outlets communicating with each of the lowermost portions of the energy absorbing sheet 18 and enables the drainage header 14 to be mounted with openings therein communicating with the lowermost portions of the lower corrugated panel 20. Thus, one header can be disposed at one edge of the still and the other header at an edge adjacent the first edge as shown in FIG. 1.

In operation the still is installed on a piece of level ground with the earth in contact with the bottom of the sheet 20 or is floated on a body of water to be distilled. The lower portions of the upper corrugated sheet 18 act as channels for water to be distilled in the unit. Water to be distilled enters the unit through supply pipe 15 and leaves through a drainage pipe 23 to the extent that it is not vaporized in the system. In a floating system, of course, the pipes 13 and 23 can be omitted and the channels allowed to communicate with the body of water on which the still floats. As may be seen from FIG. 2 the channels are only partially filled with water 21 leaving an air space above. Solar energy entering the device is absorbed by the upper corrugated sheet 18 causing the water 21 to vaporize and the vapor to pass through the vent holes 19 to the space below the upper sheet. The lower sheet 20 is, of course, relatively cooler due to its intimate position with the earth or body of water under the unit and causes condensation of the water vapor passing through the vent holes thereby acting as condensation means for the system. The condensed water 22 leaves the unit through header 14 and the drainage pipe 15.

Obviously, modifications of the invention may be made without departing from the spirit thereof. For example, separate cooling means other than the earth can be provided for the lower corrugated sheet 20 if an alternate heat sink is available. While corrugated members disposed at right angles to one another provides a very simple configuration it is to be understood that supports may be provided to space the two panels from one another in which case the sheets need not be placed with the corrugations thereof at an angle to one another. Obviously, if desired, angles other than right angles may be used for the juxtaposed sheets. While the corrugated sheets have been shown with sinusoidal corrugations it is obvious that corrugations of other configuration would serve a similar purpose. Still other modifications will become obvious to those skilled in the art from a reading of the foregoing. Therefore, it is to be understood that within the scope of the appended claims the invention may be practiced otherwise than as specifically described.

That which is claimed is:

1. A solar still comprising a first corrugated sheet of solar energy absorbent material adapted to have the lower portions of one side thereof filled with water to be distilled, said lower portions thereby forming water channels, a plurality of vent holes through said corrugated sheet in the raised portions thereof whereby water evaporated from the channels can pass through the sheet to the spaces under the raised portions of the sheet between said channels, a first solar energy transmitting panel resting on uppermost part of said corrugated sheet to close the tops of said channels except for said vent holes, and condenser means underlying said corrugated sheet, in which evaporated water passing through said vent holes may condense and be drained from the system.

2. A solar still as defined in claim 1 wherein said condenser means comprises a second corrugated sheet having the corrugations thereof disposed at an angle to the corrugations of said first corrugated sheet whereby said first sheet rests on the raised portions of said second sheet and the lower portions of the corrugations of said second corrugated sheet act as conduits for the condensate.

3. A solar still as defined in claim 2 wherein said angle is a right angle.

4. A solar still as defined in claim 3 wherein a second solar energy transmitting panel spaced from said first energy transmitting panel overlies said first panel to provide thermal insulation against ambient air.

5. A solar still as defined in claim 1 wherein said condenser means comprises a second corrugated sheet, whereby the lower portions of the corrugations of said second corrugated sheet act as conduits for the condensate.

6. A solar still as defined in claim 5 wherein a second solar energy transmitting panel spaced from said first energy transmitting panel overlies said first panel to provide thermal insulation against ambient air.

* * * * *